(12) United States Patent
Hamanaka

(10) Patent No.: US 10,016,998 B2
(45) Date of Patent: Jul. 10, 2018

(54) PRINTING APPARATUS, PRINTING METHOD, AND NON-TRANSITORY RECORDING MEDIUM

(71) Applicant: TOSHIBA TEC KABUSHIKI KAISHA, Shinagawa-ku, Tokyo (JP)

(72) Inventor: Takahiro Hamanaka, Shizuoka (SG)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/798,708

(22) Filed: Jul. 14, 2015

(65) Prior Publication Data

US 2017/0015127 A1 Jan. 19, 2017

(51) Int. Cl.
*B41J 11/44* (2006.01)
*B41M 7/00* (2006.01)
*H04N 1/00* (2006.01)

(52) U.S. Cl.
CPC ........ *B41M 7/0009* (2013.01); *H04N 1/0032* (2013.01); *H04N 1/0057* (2013.01); *H04N 1/00411* (2013.01)

(58) Field of Classification Search
CPC ........ B41J 29/36; B41J 29/26; B41M 7/0009; H04N 1/0032; H04N 1/00411; H04N 1/0057
See application file for complete search history.

(56) References Cited

U.S. PATENT DOCUMENTS

| | | | | |
|---|---|---|---|---|
| 5,482,392 | A * | 1/1996 | Asano et al. | 400/697 |
| 5,729,001 | A * | 3/1998 | Spitz | 235/462.01 |
| 2004/0057768 | A1* | 3/2004 | Oshino et al. | 400/103 |
| 2007/0201922 | A1* | 8/2007 | Takahashi | G03G 15/5095 399/394 |
| 2009/0066987 | A1* | 3/2009 | Inokuchi | G03G 15/36 358/1.13 |
| 2011/0116817 | A1* | 5/2011 | Heid et al. | 399/38 |
| 2016/0297213 | A1 | 10/2016 | Hamanaka | |

* cited by examiner

*Primary Examiner* — Matthew G Marini
(74) *Attorney, Agent, or Firm* — Amin, Turocy & Watson LLP

(57) ABSTRACT

There is provided a printing apparatus, including: an obtaining portion and a printing portion. The obtaining portion obtains information regarding an image in which visibility is made to deteriorate on a sheet on which the image is printed. The printing portion overwrites an image having a printing surface pattern on the sheet by using an ink ribbon based on the obtained information.

9 Claims, 16 Drawing Sheets

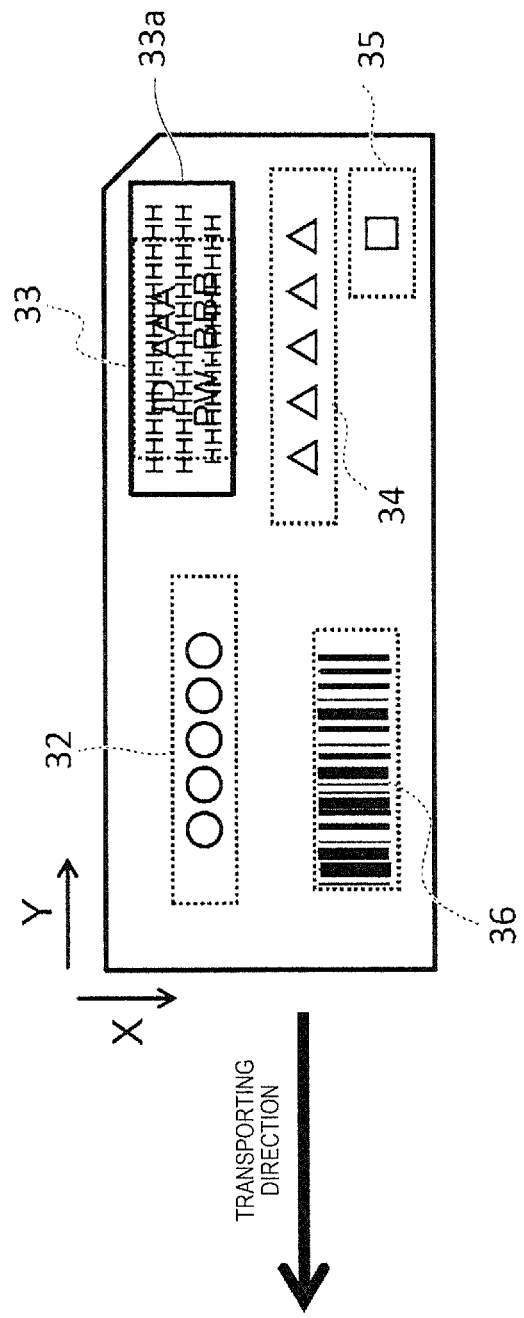

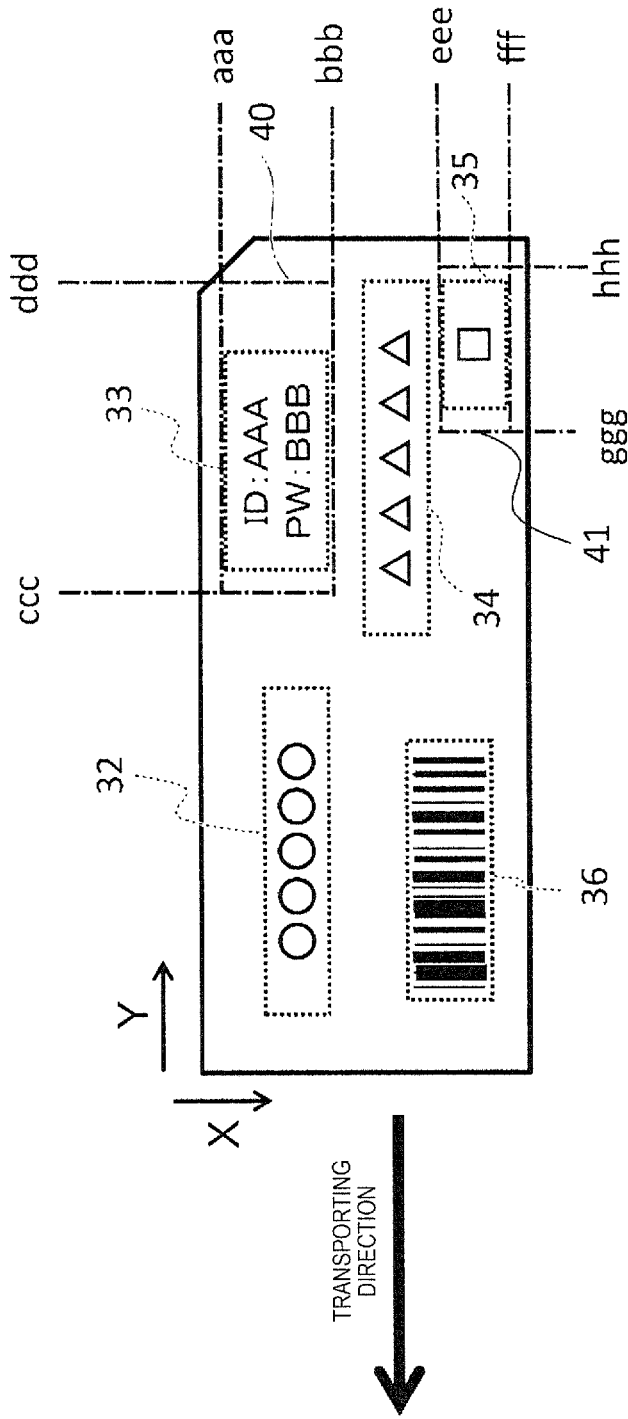

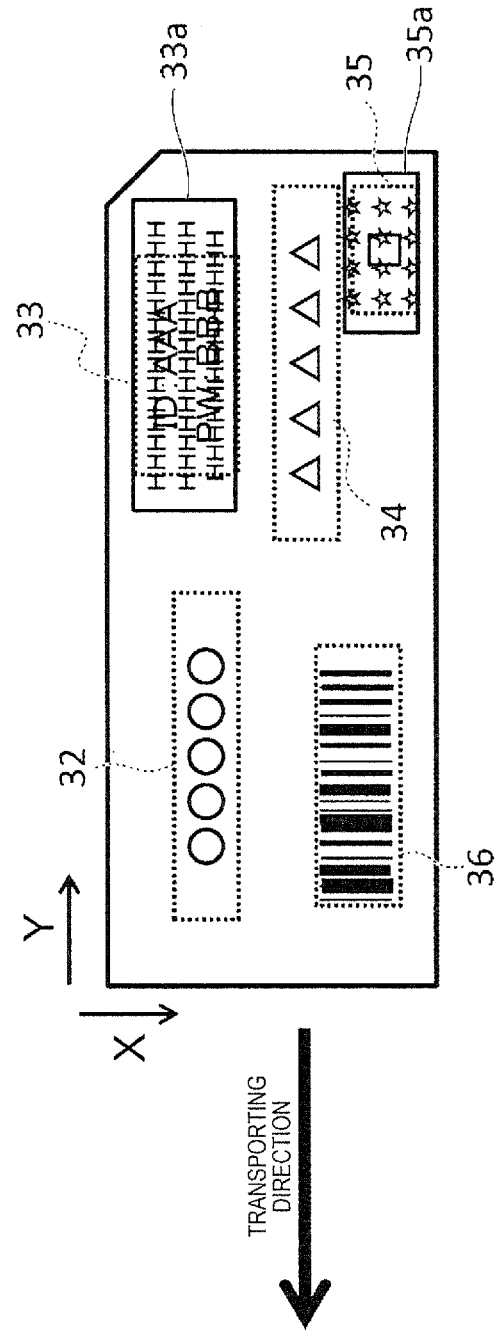

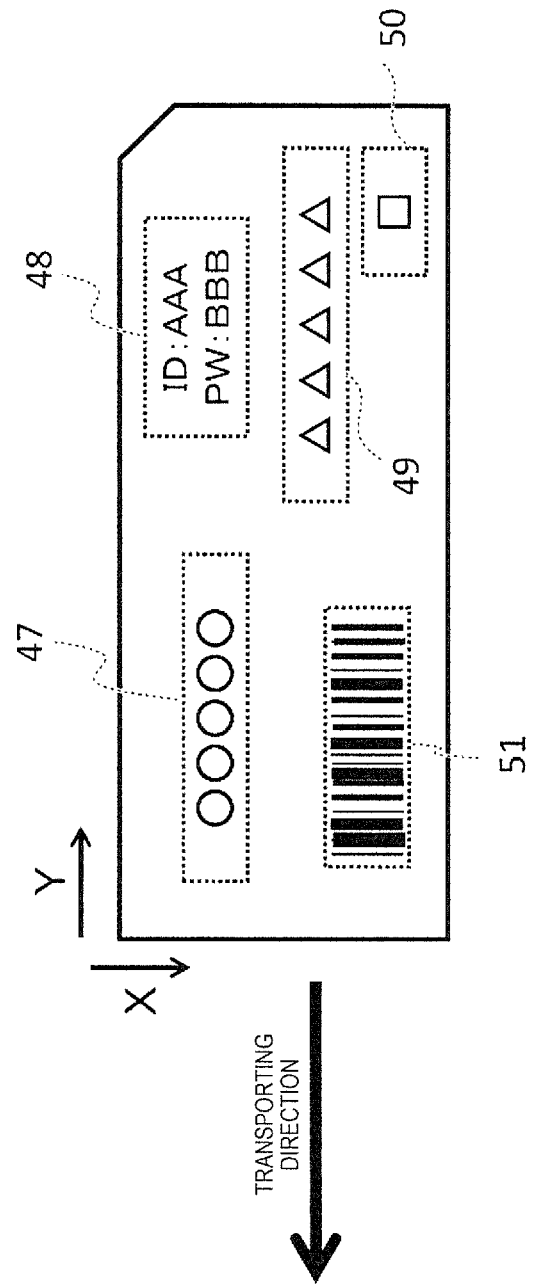

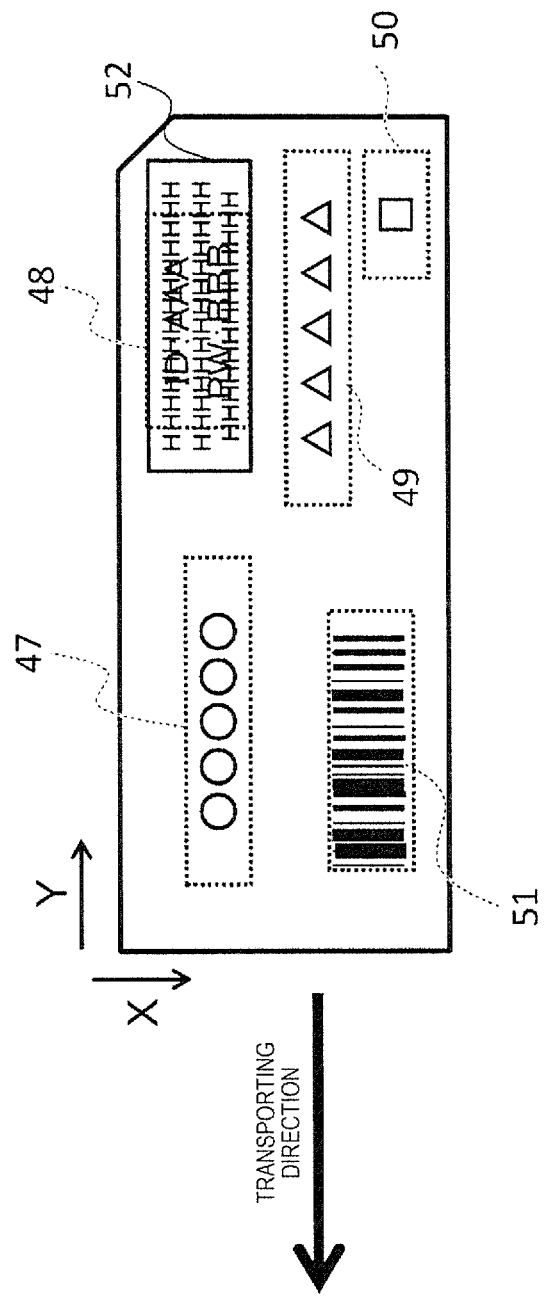

PRINTING APPARATUS, PRINTING METHOD, AND NON-TRANSITORY RECORDING MEDIUM

FIELD

Embodiments described herein relate generally to a printing apparatus, a printing method, and a non-transitory recording medium.

BACKGROUND

In the related art, a shredder is used in erasing an image containing confidential information or personal information (hereinafter, referred to as "confidential information or the like") which is printed on a sheet. However, in the case of the shredder, a load of a user increases as the amount of sheets which are to be shredded increases.

In addition, when the user stamps an image having a special printing surface pattern on the confidential information or the like, visibility of the image containing the confidential information or the like also easily deteriorates.

However, in this case, the load of the user increases as the amount of the sheets which are the targets to be erased increases, similarly to in the case of the shredder. Such a problem is not limited to erasing the image of the confidential information or the like printed on the sheet, but is common to all of the cases where the user desires to erase the printed image on the sheet.

DESCRIPTION OF THE DRAWINGS

FIGS. 6A and 6B are schematic views illustrating a specific example of erasing and printing.

FIGS. 9A and 9B are schematic views illustrating a specific example of erasing and printing when the plurality of performance ranges are set.

FIGS. 12A and 12B are schematic views illustrating a specific example of erasing and printing.

DETAILED DESCRIPTION

A printing apparatus according to an embodiment includes an obtaining portion and a printing portion. The obtaining portion obtains information regarding an image of which visibility is a target which may deteriorate on a sheet on which the image is printed. The printing portion overwrites an image having a printing surface pattern on the sheet by using an ink ribbon based on the obtained information.

Hereinafter, the printing apparatus according to the embodiment will be described with reference to the drawings.

Figure 1:
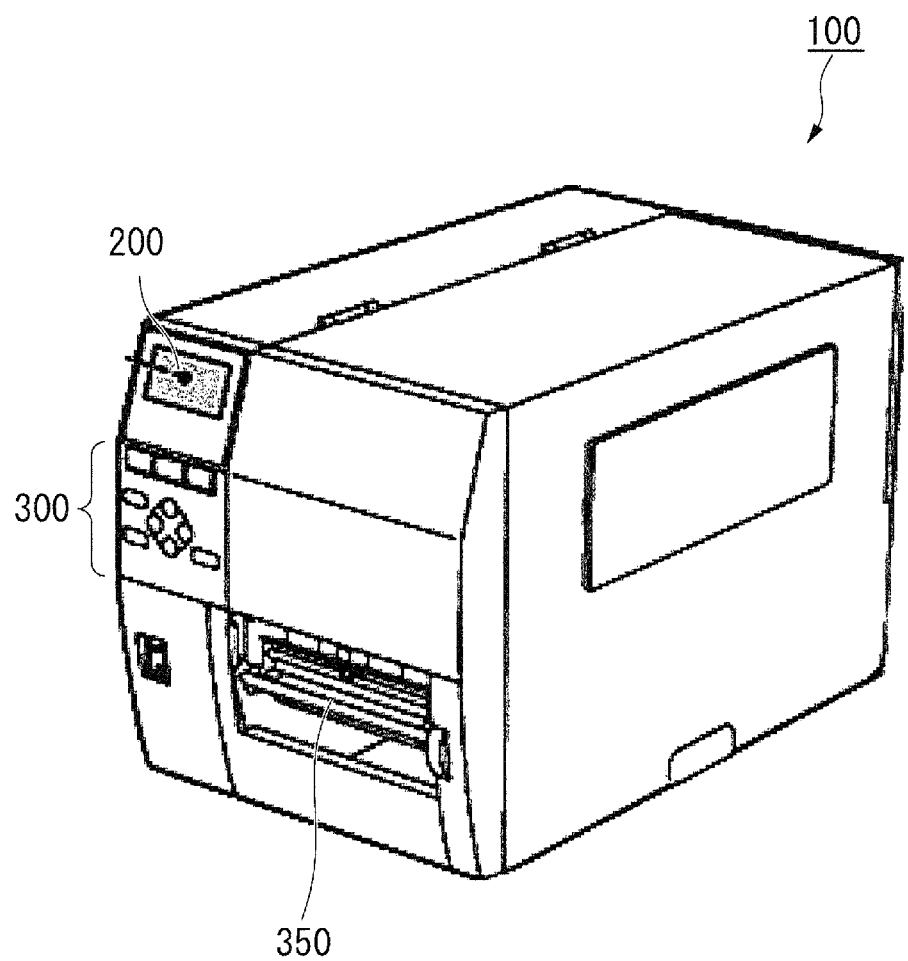
FIG. 1 is a view illustrating the external appearance of a configuration of a printing apparatus of an embodiment.

FIG. 1 is a view showing the external appearance of a configuration of a printing apparatus 100 of the embodiment.

The printing apparatus 100 prints a predetermined image on the sheet and issues the sheet (hereinafter, referred to as a "printed sheet") on which the image is printed. As an example of the sheet, a cut sheet is used in the embodiment. In addition, the printing apparatus 100 overwrites an image having a special printing surface pattern with respect to a predetermined region of the printed sheet. The predetermined region is indicated as a region of which visibility is a desired target which may deteriorate by a user on the printed sheet. The special printing surface pattern is a printing surface pattern of a structure in which a plurality of symbols are arranged. Here, the symbol is a letter, a number, a character, or a mark. The printing apparatus 100 makes the visibility of the image printed within the predetermined region deteriorate by printing the image having the special printing surface pattern with respect to the predetermined region on the printed sheet. In the description below, it is described that processing of printing the image having the special printing surface pattern with respect to the image which is printed in the predetermined region on the printed sheet, is referred to as erasing and printing.

As illustrated in FIG. 1, the printing apparatus 100 includes a display portion 200, an operating portion 300, and a discharging port 350.

The display portion 200 is an image display device, such as a liquid crystal display or an organic electro-luminescence (EL) display. The display portion 200 operates as an output interface and displays of characters or images. For example, the display portion 200 displays a range setting screen. The range setting screen is, for example, a screen for setting a performance range of erasing and printing with respect to the user. In addition, the display portion 200 operates as an input interface and receives an input of an instruction from the user. For example, the display portion 200 may receive an input of information which is input into the operating portion 300 when the display portion 200 operates as the input interface.

The operating portion 300 is configured by using a traditional input device, such as a button, a keyboard, or a pointing device (a mouse or a tablet). The operating portion 300 is operated by the user when the user inputs the instruction into the printing apparatus 100. For example, the operating portion 300 receives a setting instruction indicating the performance range of erasing and printing (hereinafter, referred to as a "setting instruction"), a setting instruction indicating the size of the sheet, and an instruction to perform erasing and printing.

The discharging port 350 discharges the printed sheet, or the printed sheet on which the image having the special printing surface pattern is printed.

Figure 2:
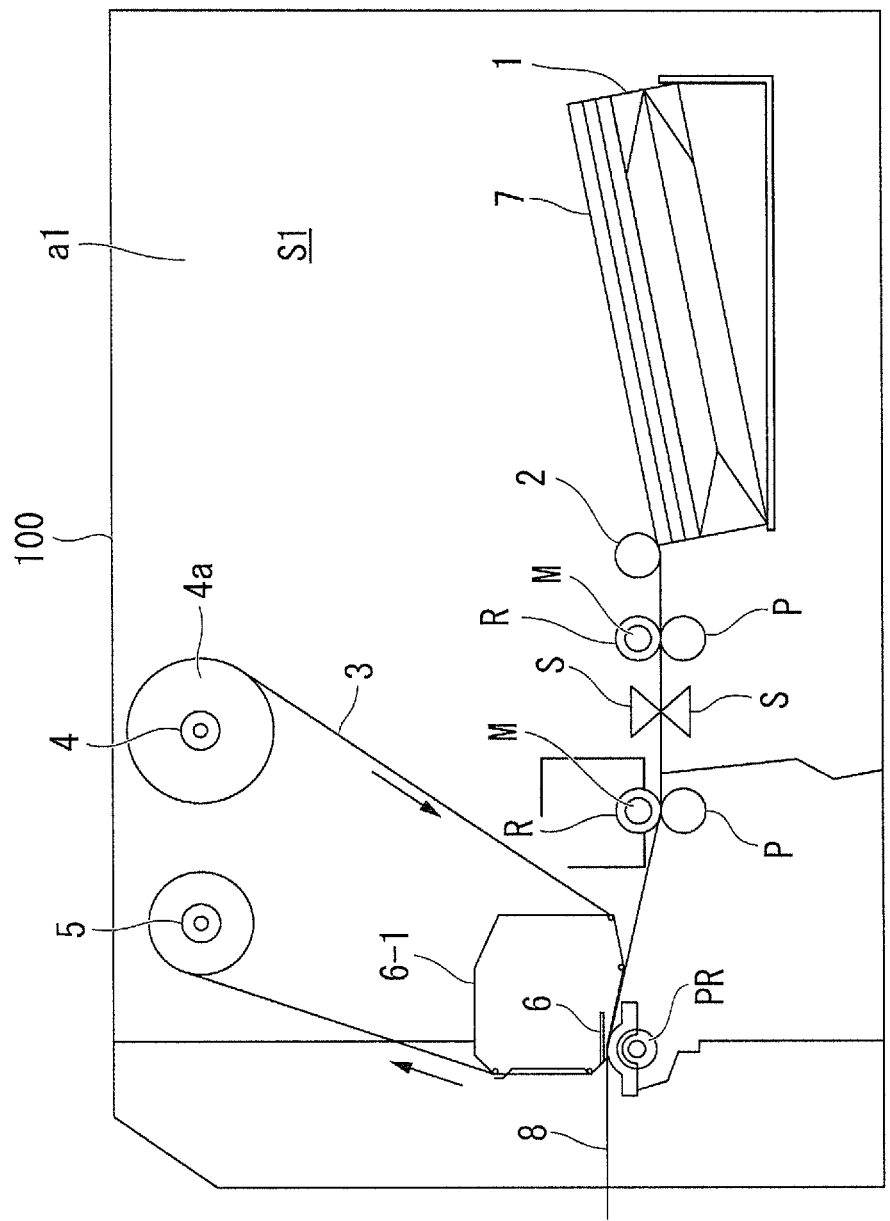
FIG. 2 is a side view illustrating an example of an internal configuration of the printing apparatus of the embodiment.
Figure 3:
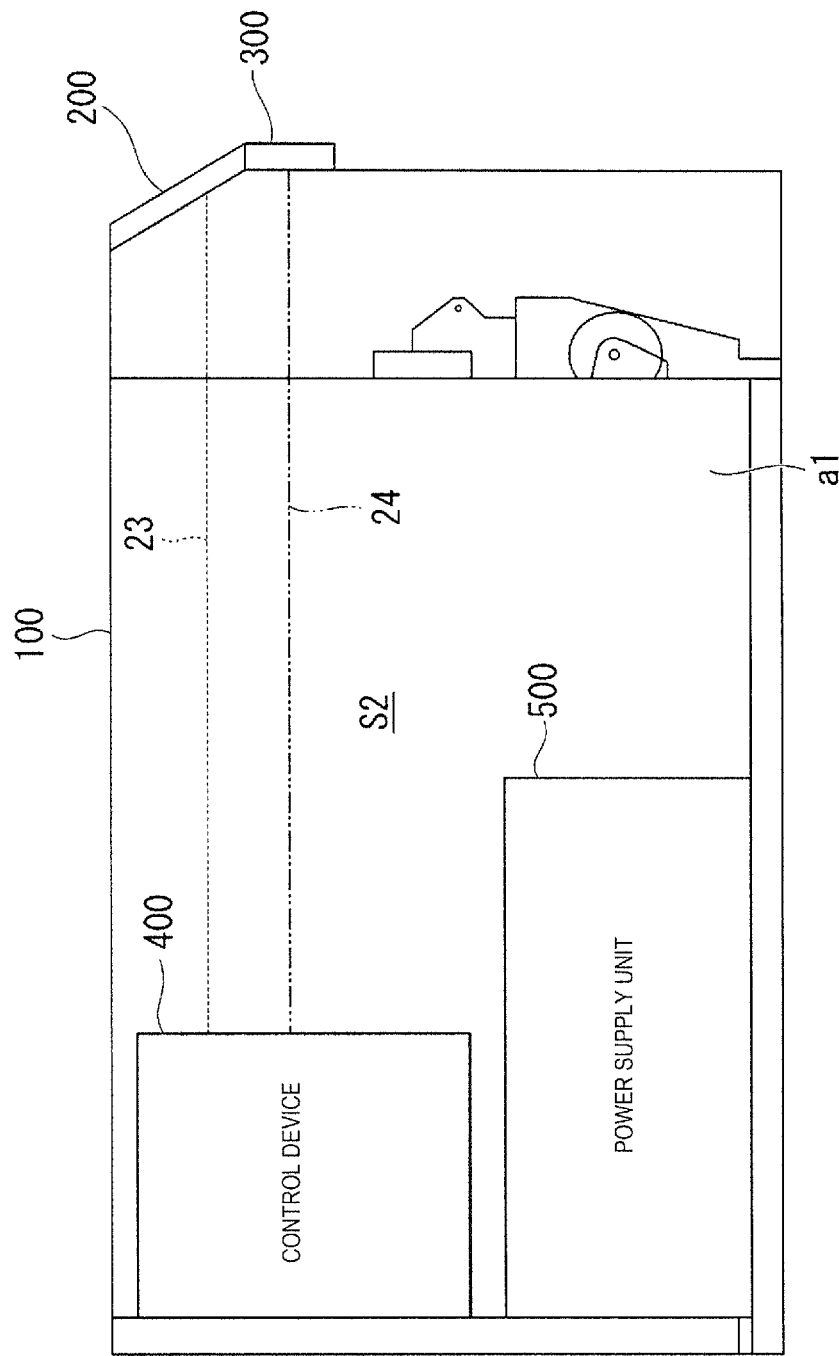
FIG. 3 is a side view illustrating an example of the internal configuration of the printing apparatus of the embodiment.

FIGS. 2 and 3 are side views illustrating an example of an internal configuration of the printing apparatus 100 of the embodiment. In FIGS. 2 and 3, views when the internal configuration of the printing apparatus 100 is viewed from respectively different sides are illustrated. As illustrated in FIGS. 2 and 3, the printing apparatus 100 includes a first chamber S1 and a second chamber S2 inside a housing. The first chamber S1 and the second chamber S2 are divided by a vertical wall a1. First, a configuration inside the first chamber S1 will be described with reference to FIG. 2.

The printing apparatus 100 includes a paper supplying tray 1, a paper supplying roller 2, a sensor S, a plurality of motors M, a plurality of platen rollers PR, a plurality of transporting rollers R, a plurality of pinching rollers P, a supply shaft 4 of an ink ribbon 3, and a winding shaft 5 and a thermal head 6 of the ink ribbon 3.

The paper supplying tray 1 is a stand for loading a sheet 7. In the embodiment, the printed sheet is loaded as the sheet 7 on the paper supplying tray 1.

The paper supplying roller 2 sends the sheet 7 (printed sheet) loaded on the paper supplying tray 1 to a transporting path 8 one by one.

The sensor S detects the presence of the sheet. The position of the printed sheet which is present in the printing apparatus 100 is detected by the sensor S. The sensor S sends notification of a detection result to a control device 400.

The motor M drives the transporting roller R. The driven transporting roller R transports the printed sheet.

The platen roller PR is rotated and driven by a rotation driving mechanism (not illustrated) which includes a motor (not illustrated), such as a stepping motor; a gear; and a belt. The platen roller PR is disposed to oppose the thermal head 6 which is provided in a printing head 6-1. The platen roller PR presses the printed sheet so that the printed sheet is appropriately transported on the transporting path 8. The printed sheet is transported to a discharging port along the transporting path 8 by the transporting roller R and the platen roller PR. In the description below, a mechanism which is configured of the platen roller PR, the rotation driving mechanism, and the transporting roller R is referred to as a transporting mechanism.

The pinching roller P is disposed to oppose the transporting roller R.

On the supply shaft 4 of the ink ribbon 3, a roller portion (hereinafter, referred to as a "ribbon roller") 4a of the ink ribbon 3 is set. The winding shaft 5 is rotated and driven by the rotation driving mechanism (not illustrated) which includes a motor (not illustrated), a gear, a belt and the like. The ink ribbon 3 is wound around the winding shaft 5 and is drawn out of the ribbon roller 4a by the rotation of the winding shaft 5. The ink ribbon 3 is nipped between the thermal head 6 and the platen roller PR together with the printed sheet.

The printing head 6-1 prints the image on the sheet 7. The printing head 6-1 includes the thermal head 6.

The thermal head 6 is disposed to oppose the platen roller PR, above the platen roller PR. The thermal head 6 prints the printed sheet which is transported by the platen roller PR and the transporting roller R. In the embodiment, the thermal head 6 overwrites the image having the special printing surface pattern on the printed sheet by using the ink ribbon 3 according to a control of the control device 400. The thermal head 6 is provided to be contactable with and separable from the platen roller PR, and is biased by an elastic member toward the platen roller PR. The thermal head 6 which is biased to the elastic member presses the printed sheet which is transported between the thermal head 6 and the platen roller PR, to the platen roller PR. The thermal head 6 includes a plurality of heating elements which are disposed in a row and heats the heating elements by selectively energizing the plurality of heating elements. The thermal head 6 prints by melting or sublimating ink of the ink ribbon 3 with the heat of the heating elements and by transferring the ink to the printed sheet. In the description below, a mechanism which is configured of the thermal head 6, the ink ribbon 3, the supply shaft 4, the winding shaft 5, the rotation driving mechanism, and the platen roller PR is referred to as a printing mechanism.

Next, a configuration of the inside of the second chamber S2 will be described with reference to FIG. 3.

As illustrated in FIG. 3, the control device 400 and a power supply unit 500 are accommodated in the second chamber S2.

The control device 400 controls all of the operations of the printing apparatus 100. For example, the control device 400 controls the transporting mechanism and the printing mechanism. In addition, the control device 400 drives the paper supplying roller 2 and transports the printed sheet in accordance with the performance instruction of erasing and printing. In addition, although not illustrated in FIG. 3, the rotation driving mechanism for driving the transporting mechanism and the rotation driving mechanism for driving the printing mechanism are provided in the second chamber S2.

The power supply unit 500 supplies power to the printing apparatus 100. A dashed line 23 indicates a path through which data passes between the display portion 200 and the control device 400 that are provided in the printing apparatus 100. A dashed line 24 indicates a path through which the data passes between the operating portion 300 and the control device 400.

The instruction which is input into the display portion 200 and the operating portion 300 is notified to the control device 400.

Hereinafter, the control device 400 will be described in detail.

First Embodiment

Figure 4:
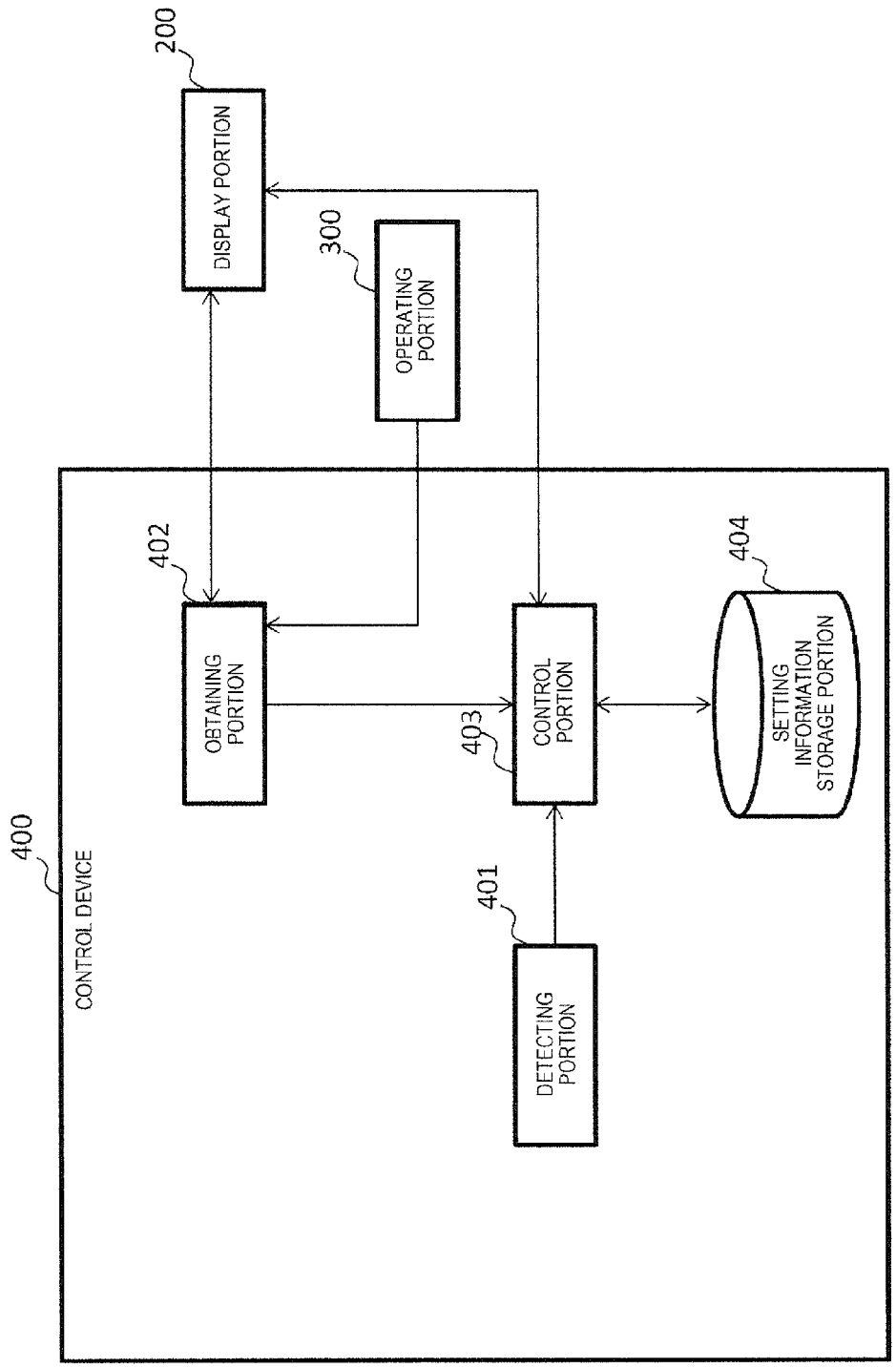
FIG. 4 is a schematic block diagram illustrating a functional configuration of a control device.

FIG. 4 is a schematic block diagram illustrating a functional configuration of the control device 400 according to a first embodiment.

The control device 400 includes a central processing unit (CPU), a memory, an auxiliary storage device and the like which are connected by buses, and executes a control program. The control device 400 functions as a device which includes a detecting portion 401, an obtaining portion 402, a control portion 403, and a setting information storage portion 404, as executing the control program. In addition, all or a part of functions of the control device 400 may be realized by using hardwares, such as an application specification integrated circuit (ASIC), a programmable logic device (PLD), or a field programmable gate array (FPGA). In addition, the control program may also be recorded on a recording medium which can be read by a computer. The recording medium which can be read by the computer is a storage device, such as a portable medium including a flexible disk, an optical magnetic disk, a ROM, or a CD-ROM, and a hard disk which is embedded in a computer system. In addition, the control program may be sent and received via an electric communication line.

The detecting portion 401 detects the presence of the printed sheet, and the length of the printed sheet with respect to a transporting direction based on a detection result notified from the sensor S.

The obtaining portion 402 obtains instruction information input into the display portion 200 by the user. In the instruction information, information such as the setting instruction, the setting instruction indicating the size of the sheet, and the performance instruction of erasing and printing is included. In addition, the obtaining portion 402 obtains operation information which is input into the operating portion 300 by the user. In the operation information, the information such as the setting instruction, the setting instruction indicating the size of the sheet, and the performance instruction of erasing and printing is included.

The control portion 403 controls each functional portion of the control device 400, the printing mechanism, and the transporting mechanism. For example, when the performance instruction of erasing and printing is given, the control portion 403 drives the paper supplying roller 2 and transports the printed sheet to the transporting path 8. In addition, the control portion 403 controls the printing mechanism and makes the printing mechanism erase and print within the performance range of erasing and printing based on the set information. In addition, when the setting instruction is given, the control portion 403 displays the range setting screen on the display portion 200. The control portion 403 stores the information regarding the size of the printed sheet which is a target to be erased and printed, in advance. The information regarding the size of the printed sheet which is the target to be erased and printed is set before the user erases and prints.

The setting information storage portion 404 is configured by using a storage device, such as a magnetic hard disk device or a semiconductor storage device. The setting information storage portion 404 stores information (hereinafter, referred to as "setting information") regarding the performance range of erasing and printing which is set by the user. In addition, the setting information storage portion 404 may store the setting information regarding every size of the printed sheet.

Figure 5:
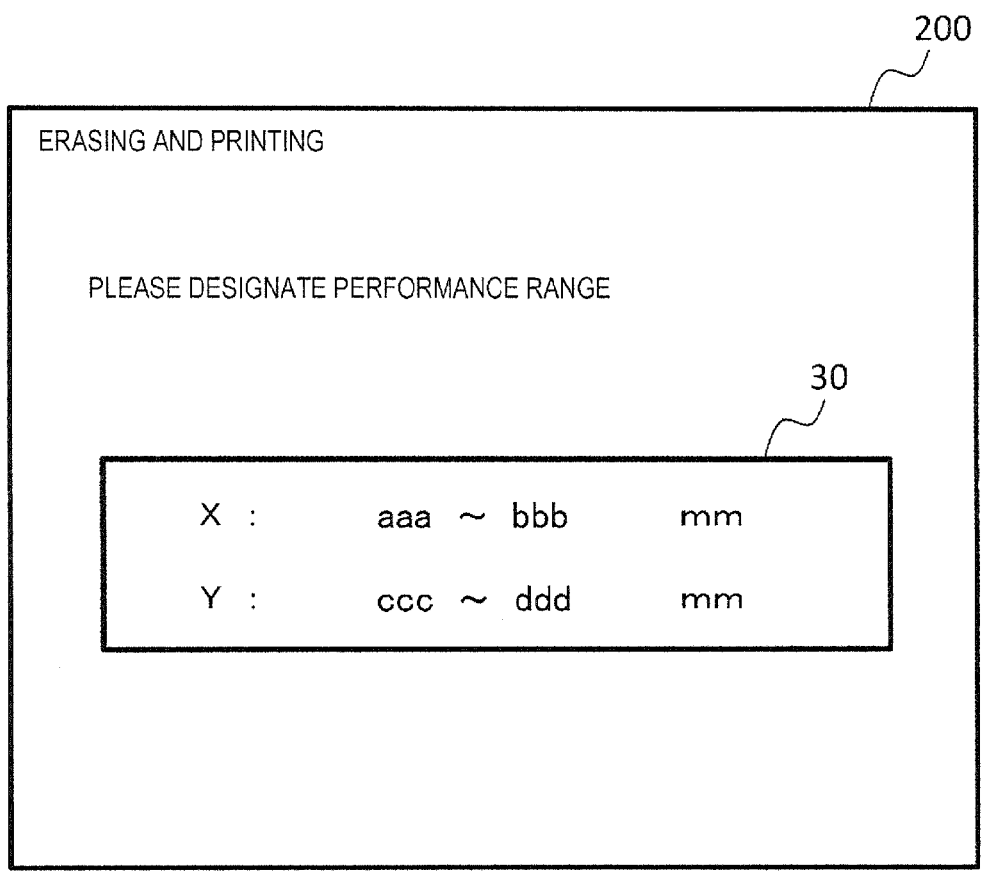
FIG. 5 is a view illustrating a specific example of a range setting screen displayed on a display portion.

FIG. 5 is a view illustrating a specific example of the range setting screen displayed by the display portion 200.

The range setting screen illustrated in FIG. 5 is displayed on the display portion 200 in accordance with the operation of the operating portion 300 by the user. Specifically, when notification of the input of the setting instruction from the operating portion 300 in accordance with the operation of the operating portion 300 is sent, the control portion 403 displays the range setting screen on the display portion 200.

On the range setting screen, character strings which indicate the instruction with respect to the user and a range setting region 30 are displayed. In FIG. 5, a character string of "Please designate the performance range" is displayed as a specific example of the character string which indicates the instruction with respect to the user. The range setting region 30 indicates a region for setting the performance range of erasing and printing. In the range setting region 30, two items, X and Y are illustrated.

The item X indicates an item used for setting the range in a vertical direction with respect to the transporting direction of the printed sheet. The item Y indicates an item used for setting the range in a horizontal direction with respect to the transporting direction of the printed sheet. In addition, a value illustrated in the range setting region 30 is set by considering an upper left point of the printed sheet as a reference point (0 mm). In other words, as the values of the items X and Y increase, the range which is far from the reference point is set to be in the performance range.

In the example illustrated in the range setting region 30, the value of the item X is aaa to bbb (mm: millimeter), and the value of the item Y is ccc to ddd (mm). In other words, a region which is surrounded by aaa to bbb (mm) in the vertical direction and ccc to ddd (mm) in the horizontal direction with respect to the transporting direction from the reference point of the printed sheet is the performance range.

After setting the performance range, when the user inputs the performance instruction of erasing and printing via the operating portion 300, the printing apparatus 100 erases and prints with respect to the set performance range. The erasing and printing will be illustrated with a specific example in FIGS. 6A and 6B.

Figure 6A:
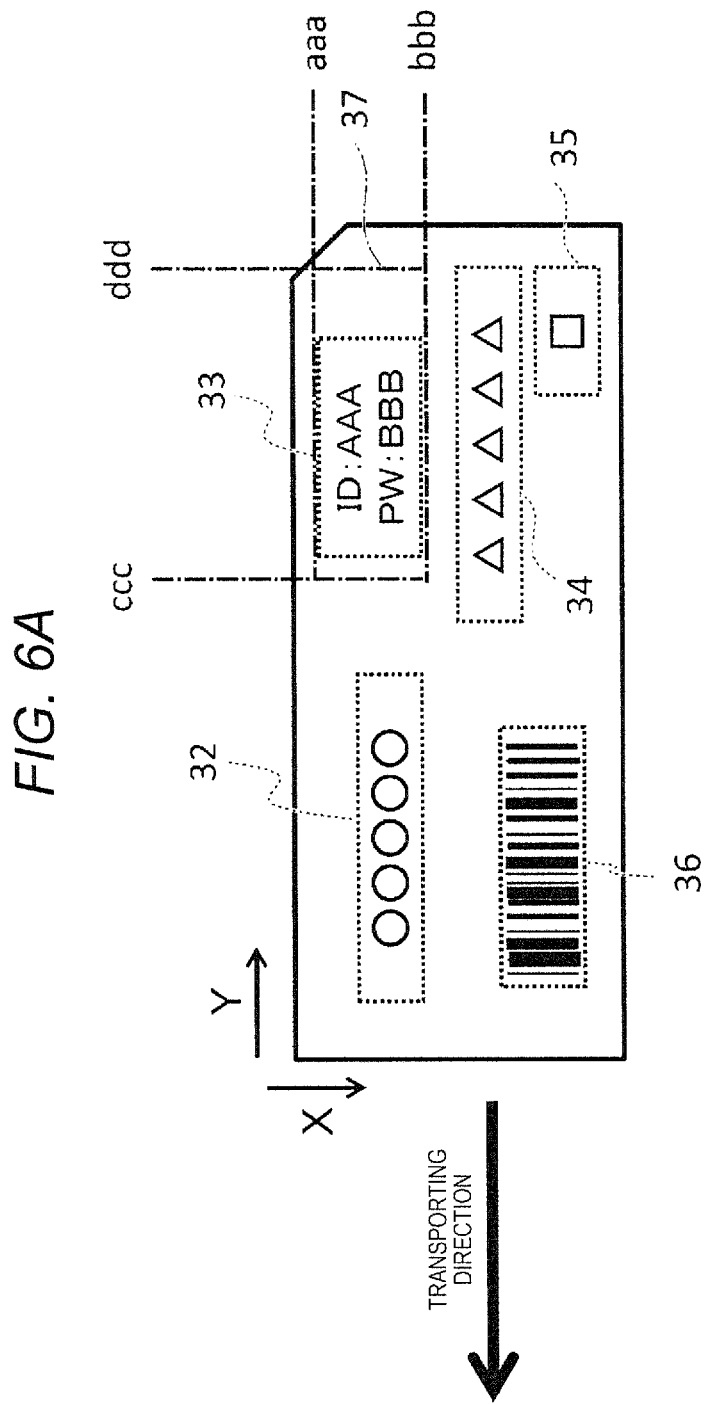

FIGS. 6A and 6B are schematic views illustrating a specific example of erasing and printing.

FIG. 6A is a view illustrating an example of the printed sheet before erasing and printing. FIG. 6B is a view illustrating an example of the printed sheet after erasing and printing.

As illustrated in FIG. 6A, a plurality of images 32 to 36 are printed on the printed sheet. A region 37 indicates the performance range of erasing and printing which is set on the range setting screen. When erasing and printing are performed, as illustrated in FIG. 6B, the image having the special printing surface pattern is overlapped in the performance range illustrated in the region 37 of the printed sheet. Accordingly, it is possible to make the visibility of the image in the performance range which is set by the user deteriorate.

Figure 7:
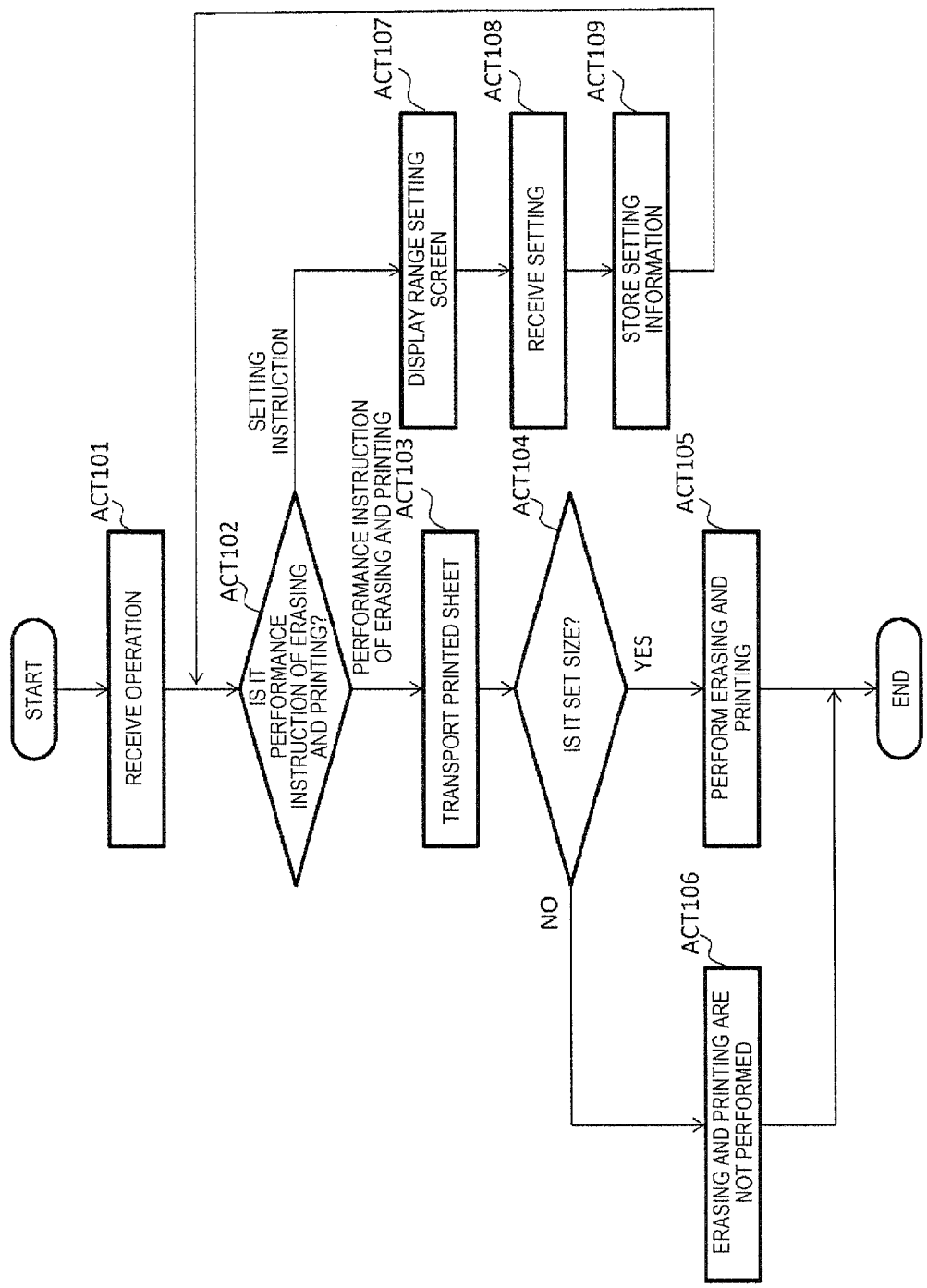
FIG. 7 is a flow chart illustrating a flow of operations performed in the printing apparatus.

FIG. 7 is a flow chart illustrating a flow of the operations performed in the printing apparatus 100. In addition, in the description of FIG. 7, the size of the printed sheet which is the target to be erased and printed is set in advance.

First, the operating portion 300 receives an operation from the user (ACT 101). For example, the operating portion 300 receives the performance instruction of erasing and printing or the setting instruction from the user. The control portion 403 determines whether the instruction input by the user is the performance instruction of erasing and printing or the setting instruction (ACT 102). When the input instruction is the performance instruction of erasing and printing (ACT 102: performance instruction of erasing and printing), the control portion 403 controls the paper supplying roller 2 and transports the printed sheet (ACT 103). The detecting portion 401 detects the size of the printed sheet based on the detection result obtained from the sensor S. The detecting portion 401 notifies the information regarding the detected size to the control portion 403. The control portion 403 determines whether or not the size of the transported printed sheet is the set size (ACT 104).

When the size of the transported printed sheet is the set size (ACT 104: YES), the control portion 403 controls the printing mechanism, and erases and prints based on the set information. The printing mechanism (the thermal head 6 or the ink ribbon 3) erases and prints according to the control of the control portion 403 (ACT 105).

Meanwhile, when the size of the transported printed sheet is not the set size (ACT 104: NO), the control portion 403 does not erase and print (ACT 106). In this case, without controlling the printing mechanism, the control portion 403 controls the transporting mechanism and outputs the printed sheet in a state of being transported from the paper supplying tray 1.

In addition, in processing of ACT 102, when the input instruction is the setting instruction (ACT 102: setting instruction), the control portion 403 displays the range setting screen on the display portion 200. The display portion 200 displays the range setting screen according to the control of the control portion 403 (Act 107). After this, the operating portion 300 receives setting related to the performance range of erasing and printing from the user (ACT 108). When the performance range of erasing and printing is set by the user, the control portion 403 stores the information regarding the set performance range in the setting information storage portion 404 as the setting information (ACT 109). After this, the process returns to the processing of ACT 102.

In the printing apparatus 100 configured in this manner, it is possible to easily make the visibility of the image which is the desired target of the user among the images printed on the printed sheet deteriorate. Hereinafter, effects thereof will be described in detail.

The printing apparatus 100 displays the range setting screen for setting the performance range of erasing and printing in accordance with the operation of the user. Accordingly, it is possible to freely set the region of which the visibility is the desired target which may deteriorate of the user. In addition, the printing apparatus 100 prints the image having the special printing surface pattern within the performance range set by the user. Therefore, the image having the special printing surface pattern is overlapped in the region including the image which is already printed. For this reason, it is possible to easily make visibility of the image which is the desired target of the user among the images printed on the printed sheet deteriorate.

In addition, as described above, the user can freely set the performance range of erasing and printing while viewing the range setting screen. For this reason, it is possible to improve convenience.

In addition, the size of the printed sheet which is the target to be erased and printed is set before erasing and printing. In addition, when the size of the printed sheet which is transported after receiving the performance instruction of erasing and printing is different from the size set in advance, erasing and printing are not performed. Therefore, since the size is different, overlapping is not performed in a region which is different from the region that the user assumes. Accordingly, it is possible to suppress unnecessary printing. For this reason, it is possible to suppress consumption of the ink ribbon 3 due to unnecessary processing.

In addition, in the embodiment, the user needs to specify the range in the vertical direction and the horizontal direction with respect to the transporting direction from the reference point of the printed sheet in order to set the performance range of erasing and printing. For this reason, there is a possibility that time and effort is spent by the user. However, the performance range of erasing and printing may not be necessarily accurate, and may be a broad range which includes the image of which the visibility is the target which may deteriorate of the user. Therefore, the user may also set a broad range without strictly setting the range. For this reason, time and effort spent by the user decreases.

Next, a modification example of the printing apparatus 100 and the control device 400 will be described.

In the embodiment, a configuration (configuration in which one performance range is designated) in which the user sets one performance range is illustrated, but a plurality of performance ranges may be configured to be set, which will be described in detail with reference to FIGS. 8, 9A, and 9B.

Figure 8:
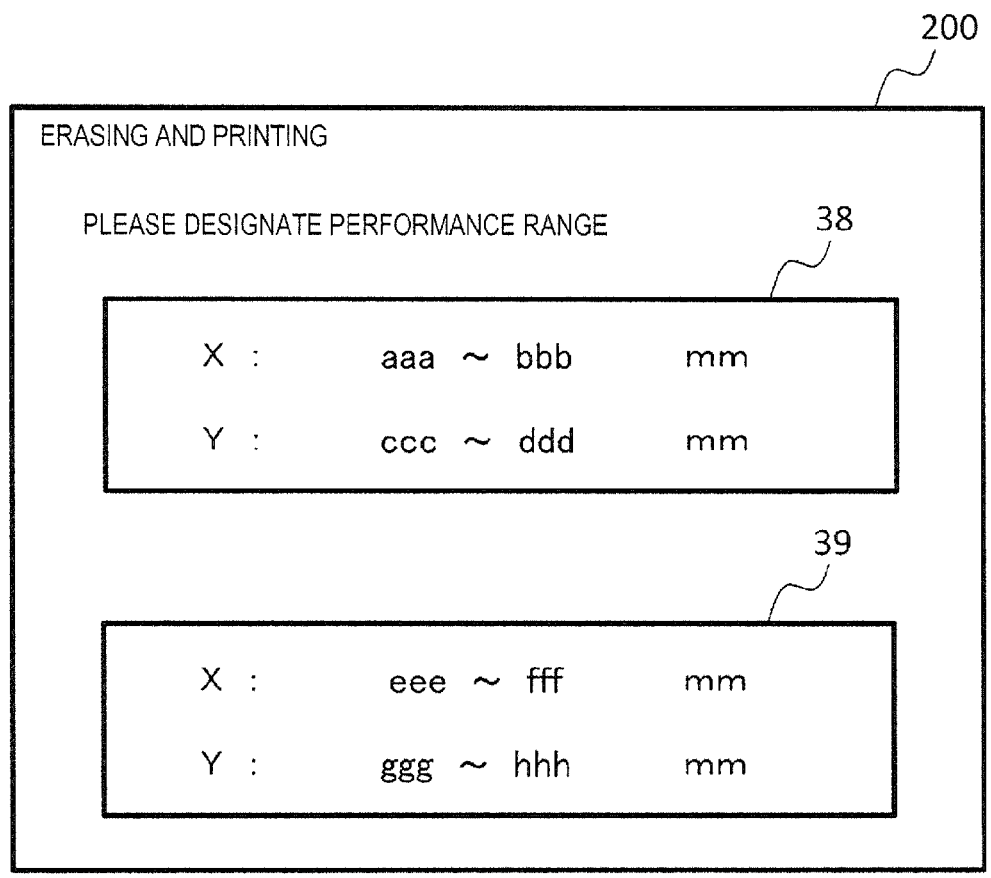
FIG. 8 is a view illustrating a specific example of the range setting screen when a plurality of performance ranges are set.

FIG. 8 is a view illustrating a specific example of the range setting screen when the plurality of performance ranges are set.

The range setting screen illustrated in FIG. 8 is displayed on the display portion 200 in accordance with the operation of the operating portion 300 by the user. Specifically, when notification of an input of an instruction of setting a plurality of performance ranges from the operating portion 300 is sent, the control portion 403 displays the range setting screen on the display portion 200 illustrated in FIG. 8.

On the range setting screen illustrated in FIG. 8, a plurality of range setting regions 38 and 39 which are different from those of the range setting screen illustrated in FIG. 5 are displayed. In addition, on the range setting screen illustrated in FIG. 8, three or more range setting regions may be displayed.

In the range setting regions 38 and 39, a value of an item X is aaa to bbb, and eee to fff (mm), and a value of an item Y is ccc to ddd, and ggg to hhh (mm). In other words, a region which is surrounded by aaa to bbb (mm) in the vertical direction and ccc to ddd (mm) in the horizontal direction with respect to the transporting direction from the reference point of the printed sheet is the performance range. Furthermore, a region which is surrounded by eee to fff (mm) in the vertical direction and ggg to hhh (mm) in the horizontal direction with respect to the transporting direction from the reference point of the printed sheet is also the performance range. After setting the performance range, when the user inputs the performance instruction of erasing and printing via the operating portion 300, the printing apparatus 100 erases and prints with respect to each set performance range. The erasing and printing when the plurality of performance ranges are set will be illustrated with a specific example in FIGS. 9A and 9B.

FIGS. 9A and 9B are schematic views illustrating a specific example of erasing and printing when the plurality of performance ranges are set.

FIG. 9A is a view illustrating an example of the printed sheet before erasing and printing are performed. FIG. 9B is a view illustrating an example of the printed sheet after erasing and printing.

Regions 40 and 41 indicate the performance range of erasing and printing which is set on the range setting screen. When erasing and printing are performed, as illustrated in FIG. 9B, the images having the special printing surface patterns are overlapped in the performance ranges illustrated in the regions 40 and 41 of the printed sheet. Accordingly, it is possible to make the visibility of the image in the plurality of performance ranges which are set by the user deteriorate.

The range setting screen may be displayed on the display portion 200 every time the performance instruction of erasing and printing is given. In the case of using such a configuration, after the performance instruction of erasing and printing is given, the control portion 403 displays the range setting screen on the display portion 200.

According to such a configuration, it is possible to set the performance range every time erasing and printing are performed. Therefore, no case occurs where the user forgets to set the performance range, and, it is also possible to correspond to a case where the user desires to set a range which is different from the previously set performance range as the target, according to circumstances. For this reason, it is possible to improve convenience.

The control portion 403 may stop transporting the printed sheet when the size of the printed sheet which is the target to be erased and printed is not the size set in advance.

When the performance instruction of erasing and printing is given, the printing apparatus 100 may be configured to print the image to be darker than that through general printing. In this case, when the performance instruction of erasing and printing is given, the printing apparatus 100 prints the image having the special printing surface pattern at a higher temperature than the temperature of the thermal head 6 in a case of general printing.

According to such a configuration, it is possible to make the visibility of the image which is already printed on the printed sheet deteriorate further.

The image having the special printing surface pattern may be freely selected by the user from among the plurality of patterns.

Second Embodiment

Figure 10:
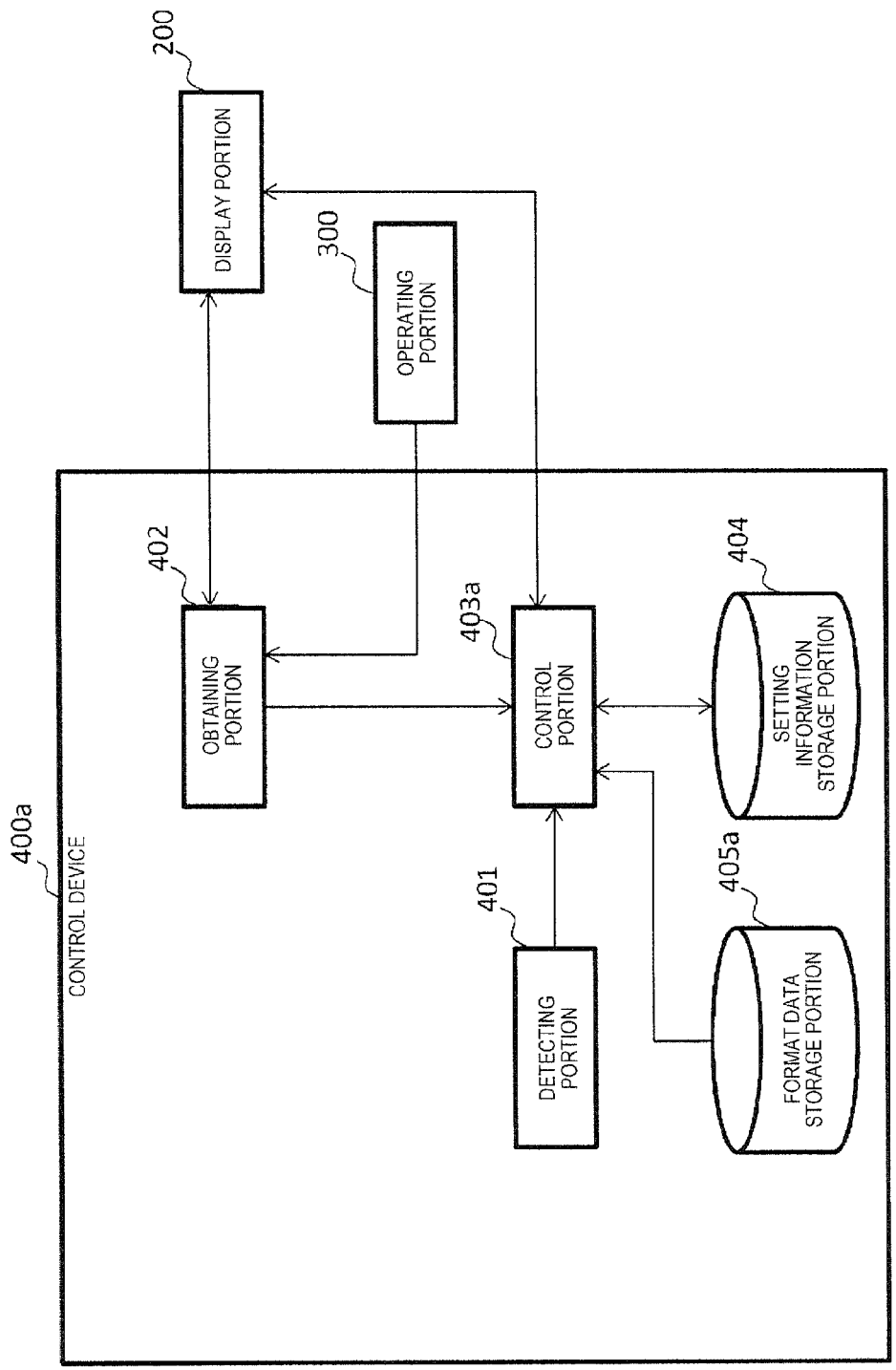
FIG. 10 is a schematic block diagram illustrating a functional configuration of a control device according to a second embodiment.

FIG. 10 is a schematic block diagram illustrating a functional configuration of a control device 400a according to a second embodiment.

The control device 400a includes the CPU, the memory, the auxiliary storage device and the like which are connected by the buses and executes the control program. The control device 400a functions as the device which includes the detecting portion 401, the obtaining portion 402, a control portion 403a, the setting information storage portion 404, and a format data storage portion 405a by executing the control program. In addition, all or a part of functions of the control device 400a may be realized by using the hardware, such as the ASIC, the PLD, or the FPGA. In addition, the control program may also be recorded on the recording medium which can be read by the computer. The recording medium which can be read by the computer is the storage device such as the portable medium including the flexible disk, the optical magnetic disk, the ROM, or the CD-ROM, and the hard disk which is embedded in the computer system. In addition, the control program may be sent and received via the electric communication line.

The control device 400a has a configuration which is different from that of the control device 400 in that the control portion 403a is provided instead of the control portion 403 and the format data storage portion 405a is newly provided. Other characteristics of the configuration are similar to those in the configuration of the control device 400. For this reason, the description of the entire control device 400a will be omitted, and the control portion 403a and the format data storage portion 405a will be described.

The format data storage portion 405a is configured by using the storage device, such as the magnetic hard disk or the semiconductor storage device. The format data storage portion 405a stores printing format data for every size of the sheet. The printing format data is data in which a region that illustrates items to be printed and a printing position on the sheet is set in advance. More specifically, in the printing format data, information related to the region which is configured of the position and each of longitudinal and lateral values for every item printed on the sheet is set. The item printed on the sheet is, for example, a name (merchandise name in a case of merchandise), code information, an ID, or a password. In addition, the position, the height, and the width may be expressed, for example, by considering the upper left point of the sheet as a starting point.

The control portion 403a controls each functional portion of the control device 400, the printing mechanism, and the transporting mechanism. For example, when the control portion 403a receives the performance instruction of erasing and printing, the control portion 403a drives the paper supplying roller 2 and transports the printed sheet to the transporting path 8. In addition, the control portion 403a controls the printing mechanism and erases and prints within the performance range of erasing and printing based on the set information. In addition, when the setting instruction is given, the control portion 403a displays the range setting screen including the printing format data on the display portion 200. The control portion 403a stores the information regarding the size of the printed sheet which is the target to be erased and printed, in advance. The information regarding the size of the printed sheet which is the target to be erased and printed is set before erasing and printing are performed by the user.

Hereinafter, based on the printing format data, a case where the performance range of erasing and printing are set will be described in detail.

First, the setting instruction is input when the user operates the operating portion 300. At this time, the user also inputs the information regarding the size of the printed sheet. When the setting instruction is input, the control portion 403a obtains the printing format data of the sheet which is illustrated by the information regarding the size, based on the format data storage portion 405a and the information regarding the size. In addition, the control portion 403a displays the range setting screen including the obtained printing format data on the display portion 200 and sets the performance range of erasing and printing. A specific example thereof is illustrated in FIG. 11.

Figure 11:
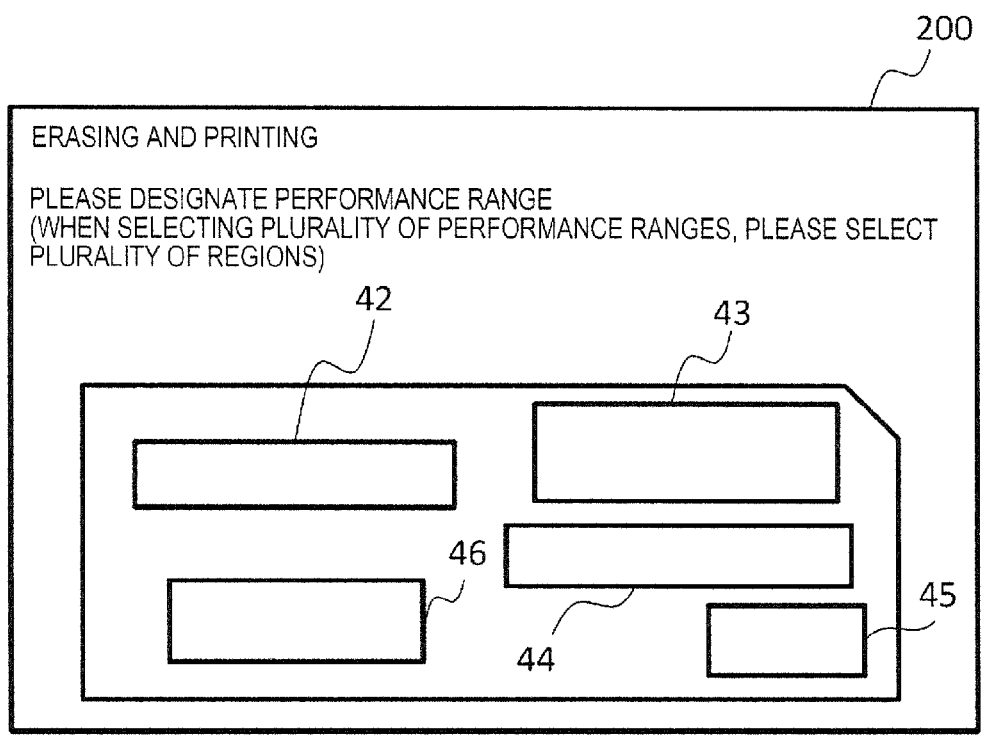
FIG. 11 is a view illustrating a specific example of the range setting screen which includes printing format data.

FIG. 11 is a view illustrating a specific example of the range setting screen which includes the printing format data. On the range setting screen illustrated in FIG. 11, the printing format data is displayed instead of the range setting region 30 of the range setting screen illustrated in FIG. 5. In addition, a character string of "Please designate the performance range (when selecting a plurality of performance ranges, please select a plurality of regions)" is displayed as a specific example of the character string which indicates the instruction with respect to the user. In the printing format data illustrated in FIG. 11, a plurality of regions 42 to 46 are displayed. A region is selected as the user touches or traces any one of the regions via the display portion 200. The control portion 403a sets a range which is illustrated by the region selected by the user as the performance range of erasing and printing. For example, when the user touches or traces the region 42, the control portion 403a sets the range which is illustrated by the region 42 as the performance range. In addition, when the user selects the plurality of regions, the control portion 403a sets the range which is illustrated by each of the selected regions as the performance range of erasing and printing. After setting the performance range, when the user inputs the performance instruction of erasing and printing via the operating portion 300, the printing apparatus 100 erases and prints with respect to the set performance range. A specific example of erasing and printing is illustrated in FIGS. 12A and 12B. In addition, FIGS. 12A and 12B illustrate a case where the region 43 is selected by the user when setting the performance range.

FIGS. 12A and 12B are schematic views illustrating a specific example of erasing and printing.

FIG. 12A is a view illustrating an example of the printed sheet before erasing and printing. FIG. 12B is a view illustrating an example of the printed sheet after erasing and printing. As illustrated in FIG. 12A, a plurality of images 47 to 51 are printed on the printed sheet. When erasing and printing, as illustrated in FIG. 12B, the image having the special printing surface pattern is overlapped in a region 52 corresponding to the region 43 selected by the user. Accordingly, it is possible to make the visibility of the image in the performance range set by the user deteriorate.

Figure 13:
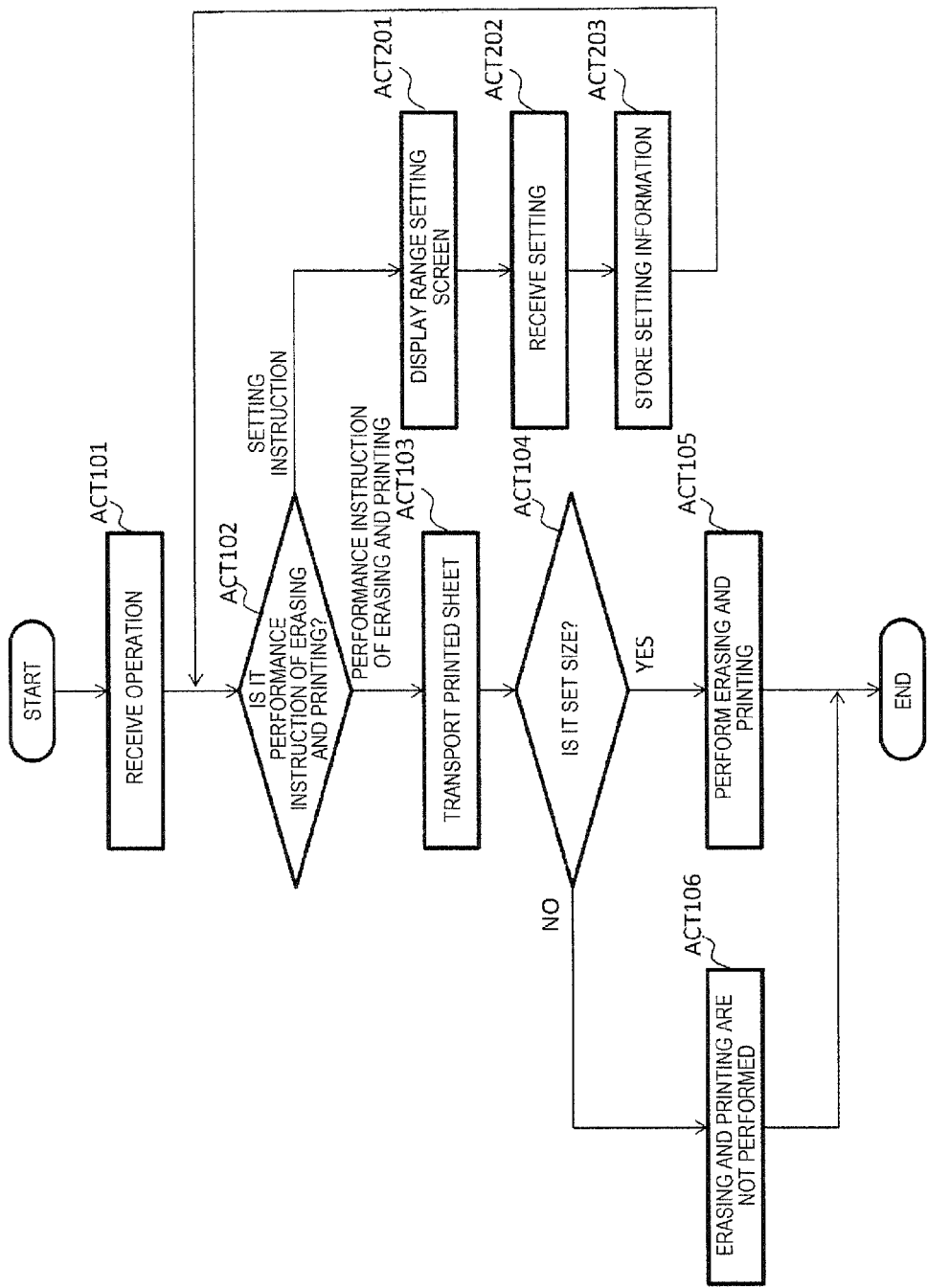
FIG. 13 is a flow chart illustrating the flow of the operations performed in the printing apparatus.

FIG. 13 is a flow chart illustrating the flow of the operations performed in the printing apparatus 100. In addition, in the description of FIG. 13, the size of the printed sheet which is the target to be erased and printed is set in advance. In addition, in FIG. 13, similar processes to those in FIG. 7 will be given similar reference numerals to those in FIG. 7 and the description thereof will be omitted.

In the processing of ACT 102, when the input instruction is the setting instruction (ACT 102: setting instruction), the control portion 403a displays the range setting screen on the display portion 200. Specifically, the control portion 403a refers to the format data storage portion 405a and obtains the printing format data which corresponds to the size of the printed sheet which is set in advance. In addition, the control portion 403a displays the range setting screen which includes the obtained printing format data on the display portion 200. The display portion 200 displays the range setting screen which includes the printing format data according to the control of the control portion 403 (ACT 201). After this, the display portion 200 receives the setting related to the performance range of erasing and printing from the user (ACT 202). Specifically, the display portion 200 receives the setting of the region which is the performance range of erasing and printing from the user. When the setting related to the performance range of erasing and printing is given from the user, the control portion 403a stores the information related to the set performance range as the setting information in the setting information storage portion 404 (ACT 203). Specifically, the control portion 403a stores the information related to the region selected by the user as the setting information in the setting information storage portion 404. After this, the process returns to the processing of ACT 102.

Due to having such a configuration, the user can easily set the performance range by inputting the information regarding the size of the printed sheet. Furthermore, it is possible to make the user actually recognize the range in which the image having the special printing surface pattern is printed. Therefore, it is possible to alleviate time and effort spent by the user. For this reason, it is possible to easily make the visibility of the image which is the desired target of the user among the images printed on the printed sheet deteriorate.

In addition, as described above, the user can freely set the performance range of erasing and printing while viewing the range setting screen. For this reason, it is possible to improve convenience.

In addition, the size of the printed sheet which is the target to be erased and printed before erasing and printing is set. In addition, when the size of the printed sheet which is transported after receiving the performance instruction of erasing and printing is different from the size set in advance, erasing and printing are not performed. Therefore, since the size is different, overlapping is not performed in a region which is different from the region that the user assumes. Accordingly, it is possible to suppress unnecessary printing. For this reason, it is possible to suppress consumption of the ink ribbon 3 due to unnecessary processing.

Next, a modification example of the printing apparatus 100 and the control device 400a will be described.

The range setting screen may be displayed on the display portion 200 every time the performance instruction of erasing and printing is given. In the case of having such a configuration, after the performance instruction of erasing and printing is given, the control portion 403a displays the range setting screen on the display portion 200.

According to such a configuration, it is possible to set the performance range every time erasing and printing are performed. Therefore, no case occurs where the user forgets to set the performance range, and it is also possible to correspond to a case where the user desires to set a range which is different from the previously set performance range as the target, according to circumstances. For this reason, it is possible to improve convenience.

The control portion 403a may stop transporting the printed sheet when the size of the printed sheet which is the target to be erased and printed is not the size set in advance.

When the performance instruction of erasing and printing is given, the printing apparatus 100 may be configured to print the image to be darker compared to that by the general printing. In this case, when the performance instruction of erasing and printing is given, the printing apparatus 100 prints the image having the special printing surface pattern at a higher temperature than the temperature of the thermal head 6 in a case of the general printing.

According to such a configuration, it is possible to further make the visibility of the image which is already printed on the printed sheet deteriorate.

The image having the special printing surface pattern may be freely selected by the user among the plurality of patterns.

A roller pair (the pinching roller P and the transporting roller R) provided in the printing apparatus 100 is not necessarily limited to being included in the number thereof illustrated in FIG. 2. For example, more of the roller pairs than the number thereof illustrated in FIG. 2 may be provided in the printing apparatus 100. In addition, the positional relationship of the transporting roller R and the pinching roller P which are illustrated as the roller pair is not necessarily limited to the positional relationship illustrated in FIG. 2. For example, the pinching roller P may be disposed to oppose the transporting roller R above the transporting roller R, and the transporting roller R may be disposed to oppose the pinching roller P below the pinching roller P.

According to at least one of the embodiments described above, by providing the obtaining portion which obtains the information regarding the image in which the visibility is made to deteriorate on the sheet on which the image is printed and the printing portion which overwrites the image having the printing surface pattern on the sheet by using the ink ribbon based on the obtained information, it is possible to easily make the visibility of the image that the user desires among the images printed on the printed sheet deteriorate.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A printing apparatus, comprising:
    a storage portion configured to store printing format data in which one or more first regions that illustrate items to be printed and a printing position on a sheet is set in advance for every size of the sheet;
    an operating portion configured to receive a set size of the sheet and fixed-position-related information indicating a range that is illustrated by one or more second regions selected by a user from the one or more first regions;
    an obtaining portion configured to obtain the fixed-position-related information and the set size of the sheet received by the operating portion, and to associate the obtained fixed-position-related information and the set size of the sheet, the sheet having at least a specific area and a non-specific area, the non-specific area being free of the image being printed, the specific area having a fixed position relative to the sheet, the fixed-position-related information defining a boundary of an area, the boundary encompassing the image of the specific area, wherein an image is printed in the specific area, and the image is subject to a deterioration of visibility, and to obtain from the storage portion the printing format data which corresponds to the set size of the sheet received by the operating portion;

a display portion configured to display the printing format data obtained by the obtaining portion, and to display the one or more first regions for selection by the user;

a sensor configured to detect the presence of the sheet;

a detecting portion configured to detect a size of the sheet based on a detection result obtained from the sensor; and a printing portion configured to print, when the size of the sheet detected by the detecting portion matches the set size of the sheet received from the operating portion, a pattern image to be darker compared to that by a general printing on only the area having the boundary defined by the fixed-position-related information obtained by the obtaining portion to selectively superimpose the pattern over the image and on only the area by an ink ribbon based on the information of the specific area.

2. The apparatus according to claim 1, further comprising:
the display portion which displays for setting the information, wherein the printing portion overwrites the image having the printing surface pattern on the sheet based on the set information.

3. The apparatus according to claim 2,
wherein the display portion displays for setting a range of printing the image having the printing surface pattern, and
wherein the printing portion overwrites the image having the printing surface pattern on the sheet within the set range.

4. The apparatus according to claim 3,
wherein the displaying is display used in setting the range in a vertical direction and in a horizontal direction with respect to a transporting direction of the sheet, and
wherein the printing portion overwrites the image having the printing surface pattern on the sheet within the set range in the vertical direction and in the horizontal direction.

5. The apparatus according to claim 2,
wherein the printing portion overwrites the image having a special printing surface pattern in each of the predetermined regions which include the image illustrated by the set information when a plurality of pieces of information are set.

6. The apparatus according to claim 1, further comprising:
wherein the printing portion does not overwrite the image having the printing surface pattern on the sheet when the size of the sheet detected by the detecting portion is not the set size of the sheet received by the operating portion.

7. The apparatus according to claim 1,
wherein the image having the printing surface pattern is configured of a plurality of symbols arranged therein.

8. A printing method, comprising:
storing printing format data in which one or more first regions that illustrate items to be printed and a printing position on a sheet is set in advance for every size of the sheet;

receiving a set size of the sheet and fixed-position-related information which indicates a range illustrated by one or more second regions selected by a user from the one or more first regions;

obtaining the received fixed-position-related information and the set size of the sheet, and associating the obtained fixed-position-related information and the set size of the sheet, the sheet having at least a specific area with an image and a non-specific area, the non-specific area being free of the image being printed, the specific area having a fixed position relative to the sheet, the fixed-position-related information defining a boundary of an area, the boundary encompassing the image of the specific area, wherein an image is printed in the specific area, and the image is subject to a deterioration of visibility, and obtaining from the storage portion the printing format data which corresponds to the set size of the sheet received by the operating portion;

displaying the printing format data obtained by the obtaining portion, and displaying the one or more first regions for selection by the user;

detecting the presence of the sheet;

detecting a size of the sheet based on a detection result obtained from a sensor; and printing, when the detected size of the sheet matches the received set size of the sheet, a pattern image to be darker compared to that by a general printing on only the area having the boundary defined by the fixed-position-related information obtained by the obtaining portion to selectively superimpose the pattern image over the image and on only the area by an ink ribbon based on the information of the specific area.

9. A non-transitory recording medium which records a computer program for executing a method in a computer, the method, comprising:

storing printing format data in which one or more first regions that illustrate items to be printed and a printing position on a sheet is set in advance for every size of the sheet;

receiving a set size of the sheet and fixed-position-related information which indicates a range illustrated by one or more second regions selected by a user from the one or more first regions;

obtaining the received fixed-position-related information and the set size of the sheet, and associating the obtained fixed-position-related information and the set size of the sheet, the sheet having at least a specific area with an image and a non-specific area, the non-specific area being free of the image being printed, the specific area having a fixed position relative to the sheet, the fixed-position-related information defining a boundary of an area, the boundary encompassing the image of the specific area, wherein an image is printed in the specific area, and the image is subject to a deterioration of visibility, and obtaining from the storage portion the printing format data which corresponds to the set size of the sheet received by the operating portion;

displaying the printing format data obtained by the obtaining portion, and displaying the one or more first regions for selection by the user;

detecting the presence of the sheet;

detecting a size of the sheet based on a detection result obtained from a sensor; and printing, when the detected size of the sheet matches the received set size of the sheet, a pattern image to be darker compared to that by a general printing on only the area having the boundary defined by the fixedposition-related information obtained by the obtaining portion to selectively superimpose the pattern image over the image and on only the area by an ink ribbon based on the information of the specific area.

* * * * *